United States Patent Office 3,366,447
Patented Jan. 30, 1968

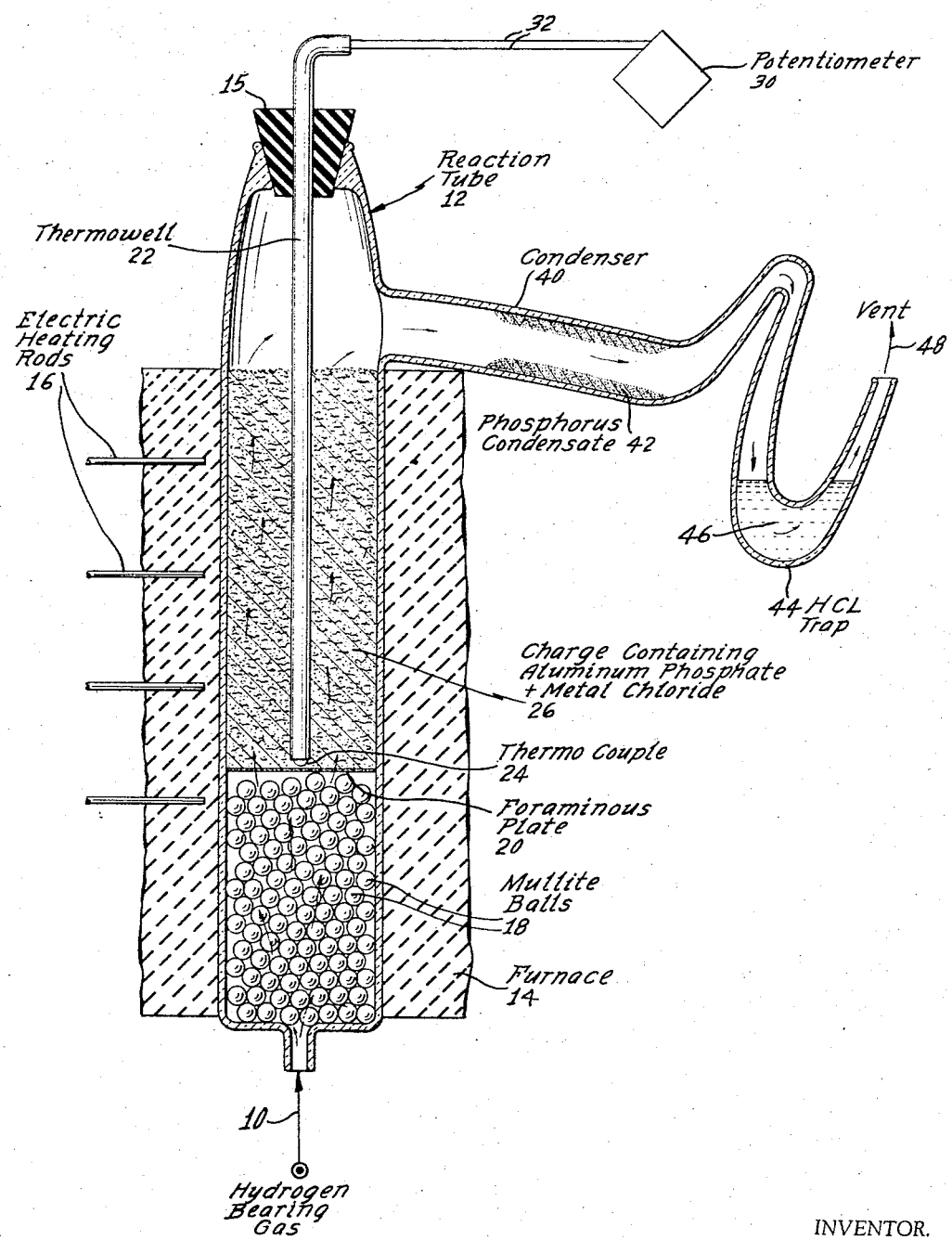

3,366,447
PHOSPHORUS AND HYDROGEN HALIDE
PRODUCTION
Ernesto Suriani, Freehold, N.J., assignor to Pullman Incorporated, Chicago, Ill., a corporation of Delaware
Filed July 1, 1965, Ser. No. 468,770
20 Claims. (Cl. 23—153)

ABSTRACT OF THE DISCLOSURE

A process for the production of elemental phosphorus and hydrogen halide which comprises contacting a mixture containing aluminum phosphate and a halide of a metal of Groups I–A, II–A and VII–B of the Periodic Chart with hydrogen as a reductant at an elevated temperature of at least 500° C. to produce elemental phosphorus and the corresponding hydrogen halide.

The present invention relates to the production of phosphorus and hydrogen halide, and more particularly, it relates to the production of phosphorus and hydrogen halide from aluminiferous phosphate, such as is found naturally occurring in leached zone ore. In one aspect, the present invention relates to a novel method and reaction for evolving hydrogen chloride, alone, during the treatment of aluminum phosphate. In another aspect, the present invention relates to a novel method and reaction for evolving mixtures of various hydrogen halides and phosphorus during the treatment of aluminum phosphate.

Deposits of aluminiferous phosphate are found naturally occurring in enormous quantities in various locations throughout the world. The Florida leached zone ore comprises one such deposit of aluminum phosphate which is represented herein by the chemical formula $AlPO_4$. Such deposits often overlie beds and layers containing tricalcium phosphate $(Ca_3(PO_4)_2)$ which is employed as feed material in the production of phosphoric acid. When ore containing tricalcium phosphate is mined, the overburden of leached zone material is removed and wasted for lack of a practicable method of recovering the $P_2O_5$ value of the aluminum phosphate. Aluminum phosphate is, for all practical purposes, not reducible with hydrogen at temperatures below about 1000° C. Attempts to reduce aluminum phosphate using coke and various fluxing agents at temperatures above 1000° C. have shown that phosphorus recovery is possible at high temperatures. Because of the extremely high temperatures required to promote acceptable recovery of phosphorus in accordance with these methods, processing of aluminum phosphate ore has not appeared to be commercially attractive in the past.

It is, therefore, the principal object of the present invention to provide a novel method and reaction in accordance with which aluminiferous phosphate material, such as is present in leached zone ore, can be efficiently and economically processed to recover phosphorus therefrom.

Another object of the invention is to provide a novel method and reaction for evolving mixtures of various hydrogen halides and phosphorus from aluminum phosphate.

Another object is to recover phosphorus from leached zone ores at temperatures which are substantially lower than are possible in accordance with known methods.

Another object of the invention is to provide a novel method and reaction for evolving hydrogen chloride, alone, during the treatment of aluminum phosphate.

Other objects and advantages inherent in the present invention will become apparent to those skilled in the art from the following description and disclosure.

The present invention is predicated upon the discovery that phosphorus, as well as various hydrogen halides, can be evolved from aluminum phosphate, such as is present in leached zone ore, when aluminum phosphate is admixed with selected metal halides, which are hereinafter described, and treated at elevated temperatures in an atmosphere containing hydrogen gas. It has been found that mixtures containing aluminum phosphate and a metal halide selected from the group consisting of lithium chloride, calcium chloride, and magnesium chloride, react in the presence of hydrogen gas such that hydrogen chloride is evolved when the temperature of the mixture is raised above the first elevated temperature level, which varies depending upon the metal chloride employed; and react above a second elevated temperature level higher than the first level to evolve phosphorus as well as hydrogen chloride. The temperature above which both phosphorus and hydrogen chloride are evolved is likewise dependent upon the particular metal chloride employed. The reactions which occur are represented in the following generalized manner:

(1) metal halide + $AlPO_4$ + $H_2$ → hydrogen halide + residue (2) metal halide + $AlPO_4$ + $H_2$ →
   hydrogen halide + $P_4$ + metal·O·$Al_2O_3$ The solid reaction mass which remains after hydrogen halide and, more particularly, after hydrogen chloride is removed in a manner represented by reaction (1) above, is designated as "residue" in view of the uncertainty as to the material remaining after hydrogen chloride removal.

It has also been found that mixtures of aluminum phosphate and certain other selected metal halides including sodium chloride, potassium chloride, barium chloride, manganese chloride, calcium bromide, calcium fluoride, magnesium fluoride and sodium fluoride react in an atmosphere containing hydrogen gas to evolve phosphorus and the corresponding hydrogen halide in a manner represented by generalized reaction (2), above, at elevated temperatures, which vary depending upon the metal halide employed. In other words, in the reactions involving metal halides, such as sodium chloride, etc., the initial hydrogen halide evolution appears to occur at about the same minimum temperature level at which phosphorus evolution occurs; whereas in the reactions involving the chlorides of lithium, calcium and magnesium, there exists a discernible temperature range below the temperatures at which phosphorus evolution occurs over which range hydrogen chloride unaccompanied by phosphorus is evolved from the mixture of the selected metal chloride and aluminum phosphate.

Generally speaking, the phosphorus values in aluminum phosphate can be recovered by heating to an elevated temperature a mixture of aluminum phosphate and a metal halide in the presence of hydrogen gas wherein the metal halide is selected from the group consisting of alkali metal halides (Group I–A of the Periodic Chart), alkaline earth metal halides (Group VII–B of the Periodic Chart) and halides of metals of Group VII–B of the Periodic Chart, thereby evolving phosphorus and the corresponding hydrogen halide. Alkali metal chloride, alkaline earth metal chloride and alkali metal fluoride and alkaline earth metal fluorides constitute preferred groupings of metal halide reactants by reason of the availability of large quantities of certain of these chlorides, such as sodium and calcium chloride, and by reason of the value of hydrogen chloride and hydrogen fluoride produced along with the phosphorus in these reactions.

In the practice of this invention, the reaction mixture is preferably comminuted, thoroughly intermixed, and dried prior to treatment in the presence of hydrogen at an elevated temperature. The phosphorus evolved from the reaction mixture is readily separated from the hydrogen halide by condensation at room temperature and hydrogen halides such as hydrogen chloride, for example, are readily removed from the remaining gaseous material by scrubbing with a neutral aqueous or basic solution. The atmosphere containing hydrogen gas which is required in order to effect reduction in accordance with the method of the present invention can be produced by flowing relatively pure hydrogen gas over the reaction mixture containing aluminum phosphate and the selected metal halide. Alternatively, hydrogen-bearing gases which decompose evolving hydrogen gas under elevated temperature reaction conditions are likewise suitable for the practice of the present invention. Any liquid, solid or gaseous hydrocarbonaceous material which produces hydrogen under reaction conditions is suitable such as, for example, methane, natural gas mixtures, ethane, propane, butane, and ethylene. It is also contemplated to employ carbonaceous material, such as coke or tars, and steam to produce a mixture containing hydrogen gas and carbon monoxide either in situ or in advance of contacting such gas with the metal halide and aluminum phosphate mixtures.

While it has been discovered that the minimum temperature level mixtures of hydrogen halide and phosphorus can be evolved varies over a wide range between about 500° C. and about 900° C. depending upon the particular metal halide which is employed in the reaction mixture with aluminum phosphate, it is preferred to effect phosphorus removal from the mixtures at temperatures which are substantially elevated above the minimum temperature levels to improve reaction rate and phosphorus recovery. A preferred temperature of operation is, thus, defined as a temperature substantially above the minimum temperature level for phosphorus and hydrogen halide removal for the selected metal halide admixed with aluminum phosphate, e.g., 50° C.–300° C. above the minimum level, and within the range of between about 600° C. and about 1200° C., and most preferably between about 600° C. and about 950° C.

Having thus described the invention in general terms, in order to provide a better understanding of the present invention, reference is now made to the drawing which illustrates diagrammatically, in elevation, one form of laboratory apparatus in which the reactions upon which the present invention is predicated were carried out.

Referring to the drawing, quartz reaction tube 12 adapted at its bottom end with inlet line 10 and by means of condenser arm 40 in an upper portion thereof is shown encased by furnace 14. Reaction charge 26 containing aluminum phosphate and calcium chloride, for example, is admitted through the upper end of reaction tube 12 which is then sealed by means of stopper 15. Thermowell 22 which has thermocouple 24 protruding from a bottom portion thereof is snugly fitted within stopper 15 and provides a means for protecting leads 32 which connect thermocouple 24 and potentiometer 30. This assembly provides a means of indicating the temperature of the reaction mixture in the reaction tube. The reaction charge 26 is supported by a foraminous porcelain plate 20. Mullite balls are situated in the lower portion of the reaction tube below the foraminous plate in order to distribute and heat hydrogen-bearing gas introduced in line 10 prior to contact with charge 26. Electric heating rods 16 situated in furnace 14 provide means for supplying heat to the gaseous and solid reactants in the reaction tube. In the operation of the apparatus described in the drawing, when the temperature of the charge 26 being treated by hydrogen admitted in line 10 reaches a certain level, which depends upon the particular metal halide selected, phosphorus and hydrogen chloride are evolved from the charge and pass into condenser 40. Phosphorus condensate is detected by the formation of a reddish-brown condensate 42 while the presence of acid such as, for example, hydrochloric acid, is detected by the passage of the remaining gas through aqueous solution 46 containing an acid-base indicator in HCl trap 44. The remaining gaseous material is exhausted through vent 48.

EXAMPLES OF OPERATION

Example 1

The charge to the reaction tube was prepared by dissolving 22.2 grams (0.20 mol) of reagent grade $CaCl_2$ in 14 ml. water. 48.8 grams of 77.3% $AlPO_4$ (0.309 mol) were then mixed into the solution of $CaCl_2$ forming a thick paste. The mixture was then dried in a vacuum chamber at about 140° C. for about 2 hours. The dried mixture was then compacted to produce pellets having diameters of approximately ⅛". 8.9 grams of the pellets were charged into a vessel such as reaction tube 12 which had a 1" diameter for treatment with hydrogen gas at a temperature of about 950° C.±50° C. for about 4 hours. The hydrogen flow rate was about 1–2 liters per minute. Phosphorus condensate 42 formed in condenser 40 and HCl was collected by means of water 46 in HCl trap 44. A sample of phosphorus collected was assayed and reported as "92% or higher" phosphorus content. The reaction mixture or charge 26 was analyzed before and after the treatment described above and the results of the analysis, interpreted on the basis of 1 mol of $Al_2O_3$, are presented below in Table I.

TABLE I

| Analytical Report No. | CaO (mols) | $Al_2O_3$ (mols) | $P_2O_5$ (mols) | Cl⁻ (mols) |
|---|---|---|---|---|
| 820–131 C before Reduction | 1.205 | 1 | 0.896 | 2.19 |
| 820–131 C after Reduction | 1.220 | 1 | 0.424 | 0.0259 |
| Cl⁻ removal, percent | 98 | | | |
| $P_4$ removal, percent | 53.7 | | | |

Example 2

A mixture containing 0.01 gram mol $CaCl_2$, 0.0146 gram mol $AlPO_4$, and 1.0 ml. water was dried at 300° C. under atmospheric conditions for about 12 hours. The dried mixture was placed in an 8 mm. (inside diameter) reaction tube. Hydrogen was flowed over the sample at a rate of about 5.5 ml. per second. A temperature of 800° C. was maintained for about 5 hours and 40 minutes and then 1100° C. for about 1 additional hour. Analyses of the sample indicated that 86.4% of the original phosphorus was removed from the sample.

Example 3

A sample containing about 0.0179 gram mol $CaCl_2$ and about 0.0246 gram mol $AlPO_4$ were treated with ethylene at a temperature of 950° C.±50° C. for about 5 hours in a reaction tube 8 mm. (inside diameter). The charge was powdered prior to treatment. Analysis indicated 97.3% phosphorus removal.

Example 4

A sample containing 0.069 gram mol of $CaCl_2$ and 0.1035 gram mol $AlPO_4$ were treated with natural gas at 950° C.±50° C. for about 5 hours in a 1" diameter reaction tube such as reaction tube 12. The charge was pelleted (about ⅛" pellets) prior to treatment. Analysis indicated 47.8% phosphorus removal and 100% removal of Cl⁻ from the charge.

Example 5

Dried magnesium chloride and aluminum phosphate were ground in a ball mill for about 2 hours. The powdered mixture containing 6.1 grams $AlPO_4$ and 5 grams $MgCl_2$ was charged to a quartz reaction tube. Hydrogen was passed over the charge at a rate of 2 liters per minute, while the temperature of the charge was slowly elevated. When the temperature reached about 661° C. a small amount of reddish-brown condensate appeared in the condenser indicating the commencement of phosphorus removal.

Example 6

In this example, a sample containing 17.5 grams of KCl and 12.2 grams of $AlPO_4$ were charged to a quartz reaction tube. Hydrogen gas was passed through the charge while the temperature was being raised. In order to detect the initial HCl removal, 1 millimol of NaOH with red phenolphthalein indicator added was placed in water solution in an HCl trap. When the temperature of the charge reached 783° C., as indicated by potentiometric readings, a reddish-brown deposit was observed in the condenser indicating phosphorus removal while the red solution in the HCl trap became colorless indicating initial HCl removal.

Example 7

In this example, 9.2 grams (0.01 mol) $CaBr_2$ and 0.1 mol of dried $AlPO_4$ were placed in a quartz reaction tube having an 8 mm. inside diameter. Anhydrous HBr was passed through the reaction mixture while the temperature was slowly raised from about 100° C. to about 300° C. in order to remove water from the $CaBr_2$. When no more water could be detected the HBr flow was stopped, and $N_2$ gas was then used to purge HBr from the reaction mixture. $H_2$ gas was then flowed through the reaction mixture at a rate of between 0.5 and 1 liter per minute while the temperature was elevated. HBr and phosphorus were first indicated at a temperature of about 700° C. Following initial indication of phosphorus and HBr removal the temperature was slowly raised to 900° C. over a period of 2 hours and 40 minutes while the hydrogen flow was continued. The run was discontinued after 2 hours and 40 minutes. The residue weighed 3.9 grams as compared to a weight of 5.3 grams of the original charge.

Examples 8, 9, 10

In these examples, metal fluorides and $AlPO_4$ samples were separately prepared by grinding dry metal halide and dry $AlPO_4$ together in a ball mill for about 2 hours. The samples were then treated with hydrogen in a quartz reaction tube in order to ascertain initial temperatures of phosphorus and hydrogen halide removal. The results are summarized in Table II below.

TABLE II

| Metal Halide | Mols of $AlPO_4$ | Mols of metal fluoride | Initial hydrogen fluoride removal,° C. | Initial phosphorus removal,° C. |
|---|---|---|---|---|
| $CaF_2$ | 0.2 | 0.031 | 900 | 900 |
| $MgF_2$ | 0.2 | 0.035 | 900 | 900 |
| NaF | 0.2 | 0.024 | 900 | 900 |

The following laboratory data presented in Table III show the initial temperatures which were found for phosphorus and HCl removal from mixtures of metal chlorides and $AlPO_4$. In each of the cases set forth below, the reaction mixture was dried, placed in a quartz reaction tube, and treated with hydrogen at elevated temperatures.

TABLE III

| Metal chloride | Gram Mols of metal chloride | Gram Mols of $AlPO_4$ | Temperature of initial HCl,° C. | Temperature of initial phosphorus, ° C. |
|---|---|---|---|---|
| LiCl | .025 | 0.013 | 600 | 720 |
| NaCl | 0.2 | 0.1 | 725 | 725 |
| KCl | 0.2 | 0.1 | 783 | 783 |
| $MgCl_2$ | 0.052 | 0.05 | 350 | 661 |
| $CaCl_2$ | 0.3 | 0.20 | 475 | 685 |
| $BaCl_2$ | 0.144 | 0.1 | 780 | 780 |
| $McCl_2$ | 0.0157 | 0.015 | 860 | 860 |

Example 11

A mixture containing 0.2 gram mol $MgCl_2$ and 0.1 gram mol $AlPO_4$ was dried and ground in a ball mill for 2 hours. The mixture was then placed in an 8 mm. (inside diameter) quartz reaction tube under HCl gas and heated slowly from room temperature to about 300° C. $N_2$ gas was then used to purge HCl. $H_2$ gas was then flowed through the reaction mixture while the temperature was gradually raised. Phosphorus was collected in the condenser at about 492° C.

Additional experiments were carried out by preparing separate mixtures each containing $AlPO_4$ and one of the following compounds: $FeCl_2$, $CoCl_2$, $LaCl_3$, and $CrCl_3$. Each mixture was heated in hydrogen thereby evolving substantial HCl in each case. No phosphorus was observed in these cases. Another run was carried out by heating in hydrogen a mixture of elemental iron and $AlPO_4$ to determine whether iron formed by the hydrogen reduction of $FeCl_2$ would reduce $AlPO_4$. No phosphorus evolution was observed.

On the basis of these experiments set forth above, it is the inventor's hypothesis, which is not intended to limit the present invention, that metal halides which are directly reducible by hydrogen gas thereby obtaining the corresponding hydrogen halide and elemental metal at temperatures below about 1000° C. are not useful in the present invention. On the other hand, metal halides which are not directly reducible by hydrogen gas, for example, at temperatures up to 1000° C., i.e., such that when such metal halides are treated with hydrogen no hydrogen halide is evolved, are generally useful in the present invention. It has been found that in addition to reduction of aluminum phosphate by metal halides, described above, silicon dioxide, $SiO_2$, oxides of titanium ($Ti_2O_3$), and aluminum oxide ($Al_2O_3$), which compounds cannot be reduced to any appreciable extent employing hydrogen gas, alone, can be reduced and oxygen removed therefrom when such compounds are treated with hydrogen gas at an elevated temperature in the presence of metal halides such as, e.g., calcium chloride. It is contemplated that, in general, metal oxides in which the bonding free energy of the oxygen is greater than about 58 kilocalories/mol will react with selected metal halides, e.g., calcium chloride, to evolve hydrogen halide, water, and to yield a reduction product of the metal oxide. In the case of the reduction of $SiO_2$ and of $Al_2O_3$, the reactions have been carried out to obtain elemental silicon and elemental aluminum.

Having thus described the invention by reference to specific examples thereof, many modifications and alterations thereof will become apparent to those skilled in the art, but the scope and extent of the invention should be construed as limited only by the claims.

What is claimed is:

1. A process for producing phosphorus and hydrogen halide which comprises: contacting a mixture containing aluminum phosphate and a metal halide selected from the group consisting of alkali metal halides, alkaline earth metal halides and halides of metals of Group VII–B of the Periodic Chart, with hydrogen as a reductant, at a temperature of at least 500° C. and such that phosphorus and the corresponding hydrogen halide are produced as products of the process.

2. A process for producing phosphorus and hydrogen halide which comprises: heating a mixture containing aluminum phosphate and a metal halide selected from the group consisting of alkali metal halides, alkaline earth metal halides and halides of metals of Group VII–B of the Periodic Chart, in the presence of hydrogen as a reductant, to a temperature substantially above the minimum temperature at which phosphorus and hydrogen halide are produced and between about 600° C. and about 1200° C., thereby producing phosphorus and hydrogen halide as products of the process.

3. The process of claim 2 in which said metal halide comprises an alkali metal chloride and the corresponding hydrogen halide comprises hydrogen chloride.

4. The process of claim 3 in which said alkali metal chloride comprises lithium chloride.

5. The process of claim 3 in which said alkali metal halide comprises sodium chloride.

6. The process of claim 3 in which said alkali metal halide comprises potassium chloride.

7. The process of claim 2 in which said metal halide comprises an alkaline earth metal chloride and the corresponding hydrogen halide comprises hydrogen chloride.

8. The process of claim 7 in which said alkaline earth metal chloride comprises magnesium chloride.

9. The process of claim 7 in which said alkaline earth metal chloride comprises calcium chloride.

10. The process of claim 7 in which said alkaline earth metal chloride comprises barium chloride.

11. The process of claim 2 in which said halide of metals of Group VII–B of the Periodic Chart comprises manganese chloride and the corresponding hydrogen halide comprises hydrogen chloride.

12. The process of claim 2 in which said metal halide comprises an alkali metal fluoride and the corresponding hydrogen halide comprises hydrogen fluoride.

13. The process of claim 12 in which said alkali metal fluoride comprises sodium fluoride.

14. The process of claim 2 in which said metal halide comprises an alkaline earth metal fluoride and the corresponding hydrogen halide comprises hydrogen fluoride.

15. The process of claim 14 in which said alkaline earth metal fluoride comprises calcium fluoride.

16. The process of claim 2 in which said mixture is heated to between about 600° C. and about 950° C.

17. A process for producing phosphorus and hydrogen halide which comprises: introducing to a reaction zone aluminum phosphate, a metal halide selected from the group consisting of alkali metal halides, alkaline earth metal halides and halides of metals of Group VII–B of the Periodic Chart, and a hydrogen-bearing material selected from the group consisting of gaseous hydrogen and a hydrocarbonaceous material, heating said aluminum phosphate and said metal halide in said reaction zone in the presence of said hydrogen-bearing material to a temperature substantially above the minimum temperature at which phosphorus and hydrogen halide are produced and between about 500° C. and about 1200° C., withdrawing effluent from said reaction zone containing phosphorus and hydrogen halide, and recovering phosphorus and hydrogen halide as products of the process.

18. The process of claim 17 in which said hydrogen-bearing material which is added to the reaction zone is a gas comprising molecular hydrogen.

19. The process of claim 17 in which said hydrocarbonaceous material is a gaseous hydrocarbon.

20. The process of claim 17 in which said hydrocarbonaceous material is natural gas.

References Cited

UNITED STATES PATENTS

| | | | |
|---|---|---|---|
| Re. 25,455 | 10/1963 | Lobdell | 23—152 X |
| 527,163 | 10/1894 | Shearer et al. | 23—223 |

MILTON WEISSMAN, *Primary Examiner.*

EDWARD STERN, *Examiner.*

UNITED STATES PATENT OFFICE
CERTIFICATE OF CORRECTION

Patent No. 3,366,447                           January 30, 1968

Ernesto Suriani

It is certified that error appears in the above identified patent and that said Letters Patent are hereby corrected as shown below:

Column 2, line 55, "Group VII-B" should read -- Group II-A --. Column 5, TABLE III, first column, line 7 thereof, "McCl$_2$" should read -- MnCl$_2$ --.

Signed and sealed this 16th day of December 1969.

(SEAL)
Attest:

Edward M. Fletcher, Jr.
Attesting Officer

WILLIAM E. SCHUYLER, JR.
Commissioner of Patents